United States Patent [19]

Mamiya et al.

[11] Patent Number: 4,772,899
[45] Date of Patent: Sep. 20, 1988

[54] SCANNING MECHANISM FOR RECORDING APPARATUS

[75] Inventors: Toshiharu Mamiya, Kanagawa; Yoshitaka Watanabe, Tokyo; Tadashi Ishikawa, Saitama; Takashi Endo, Tokyo, all of Japan

[73] Assignee: Canon Kabushiki Kaisha, Tokyo, Japan

[21] Appl. No.: 898,691

[22] Filed: Aug. 21, 1986

[30] Foreign Application Priority Data

| Aug. 28, 1985 [JP] | Japan | 60-189276 |
| Aug. 28, 1985 [JP] | Japan | 60-189277 |
| Aug. 28, 1985 [JP] | Japan | 60-130942[U] |
| Aug. 28, 1985 [JP] | Japan | 60-130943[U] |

[51] Int. Cl.$^4$ ............................. G01D 15/14
[52] U.S. Cl. ..................... 346/139 R; 346/140 R; 384/13; 384/29; 384/292; 184/5; 184/64; 184/100; 184/102

[58] Field of Search ............... 346/139 R, 140 PD; 184/64, 100, 102, 5; 384/13, 29, 292

[56] References Cited

U.S. PATENT DOCUMENTS

| 3,985,404 | 10/1976 | Plaza et al. | 184/5 X |
| 4,120,544 | 10/1978 | Hüber | 384/292 |
| 4,491,373 | 1/1985 | Sugi et al. | 384/13 |
| 4,500,892 | 2/1985 | Hirano | 346/139 R X |
| 4,580,150 | 4/1986 | Tazaki | 346/140 PD |

Primary Examiner—E. A. Goldberg
Assistant Examiner—Huan H. Tran
Attorney, Agent, or Firm—Robin, Blecker & Daley

[57] ABSTRACT

A scanning mechanism for a recording apparatus having a carriage for scanning with a bearing portion at which the carriage is engaged on a guide shaft, whereby a dynamic pressure bearing is used in the above-defined bearing portion, and a lubricant supply member is provided on the guide shaft in a position at which the carriage arrives selectively.

3 Claims, 2 Drawing Sheets

SCANNING MECHANISM FOR RECORDING APPARATUS

BACKGROUND OF THE INVENTION

1. Field of the Invention

This invention relates to a recording apparatus, and more particularly to a scanning mechanism having a carriage with a bearing portion at which the carriage is fitted on a guide shaft.

2. Description of the Related Art

The scanning mechanism having a carriage fitted on a guide shaft at a bearing portion thereof has been widely used in the recording apparatus such as printers, magnetic or optical disc or drum recorders and reproducers, particularly as the head scanning mechanism therefor.

By the way, as the structure of the bearing portion of the head carriage in the conventional mechanism of such kind, for the carriage is entirely made of plastic by molding, a hole through which a guide shaft is to pass is provided therein and is used to be a bearing portion without any alteration, or an oil-impregnated metal ring is equipped in this through-hole and is made the bearing portion.

However, the former means has a drawback in that the load due to the friction is large, and the variation of the load with movement of the carriage is so large that even when a servo system is used to control it, a stable movement is difficult, and the speed deviation becomes large. Meanwhile, the latter means has the one-sided contact of the metal. Therefore, as that portion is abrased, the play of the carriage becomes large. Hence, its drawback lies in terms of precision accuracy and durability.

Also, in the mechanism of this kind, to assure smoothness of its operation, or smooth scanning movement of the carriage, lubrication of its bearing portion must be needed. In the past, however, such lubrication has been made by human hand as necessity arises in such a way that a lubricant oil is poured to the bearing portion. Such a maintenance is very troublesome, and the possibility of occurrence of a malfunction due to failure to replenish oil was high.

Also, when in setting up such a scanning mechanism as has been described above, there have been employed first means wherein the support members for both ends of the guide shaft are formed separately from each other to a shape of slide plates, and after these have been mounted on both ends of the guide shaft, they are fixedly secured to the base plate, or second means wherein both sides of a base plate are bent to form support portions, and holes through which the guide shaft is to pass are bored in the support portions.

However, the former or first means though having a merit that the assembling operation is relatively easy, gives a drawback that because the support members are separate ones, assurance of the accuracy is difficult, so that later adjustment is needed, and position shifts due to vibrations are liable to occur. Meanwhile, in the latter or second means, the accuracy is ready to assure, but because the guide shaft must be inserted into the holes of the support portion, there is a drawback that the handling difficulty is large and the surface of the guide shaft when being inserted is apt to be scratched or damaged, which leads to vibrations and abrasion of the carriage.

SUMMARY OF THE INVENTION

An object of the present invention is to eliminate the above-described drawbacks, and to make it possible that the carriage runs stably at a high speed by using a dynamic pressure bearing in the bearing portion of the head carriage.

Another object of the present invention is to use a dynamic pressure bearing in the bearing portion of the head carriage in combination with a lubricant supply member on the guide shaft in a position at whic:h the head carriage arrives selectively.

Still another object of the present invention is to provide a scanning mechanism of simple structure easy to set up.

Other objects and features of the present invention will become apparent from the following detailed description of the preferred embodiment thereof with reference to the accompanying drawings.

DETAILED DESCRIPTION OF THE PREFERRED EMBODIMENT

In the following, an embodiment of the invention will be described with reference to the accompanying drawings.

Figure 1:
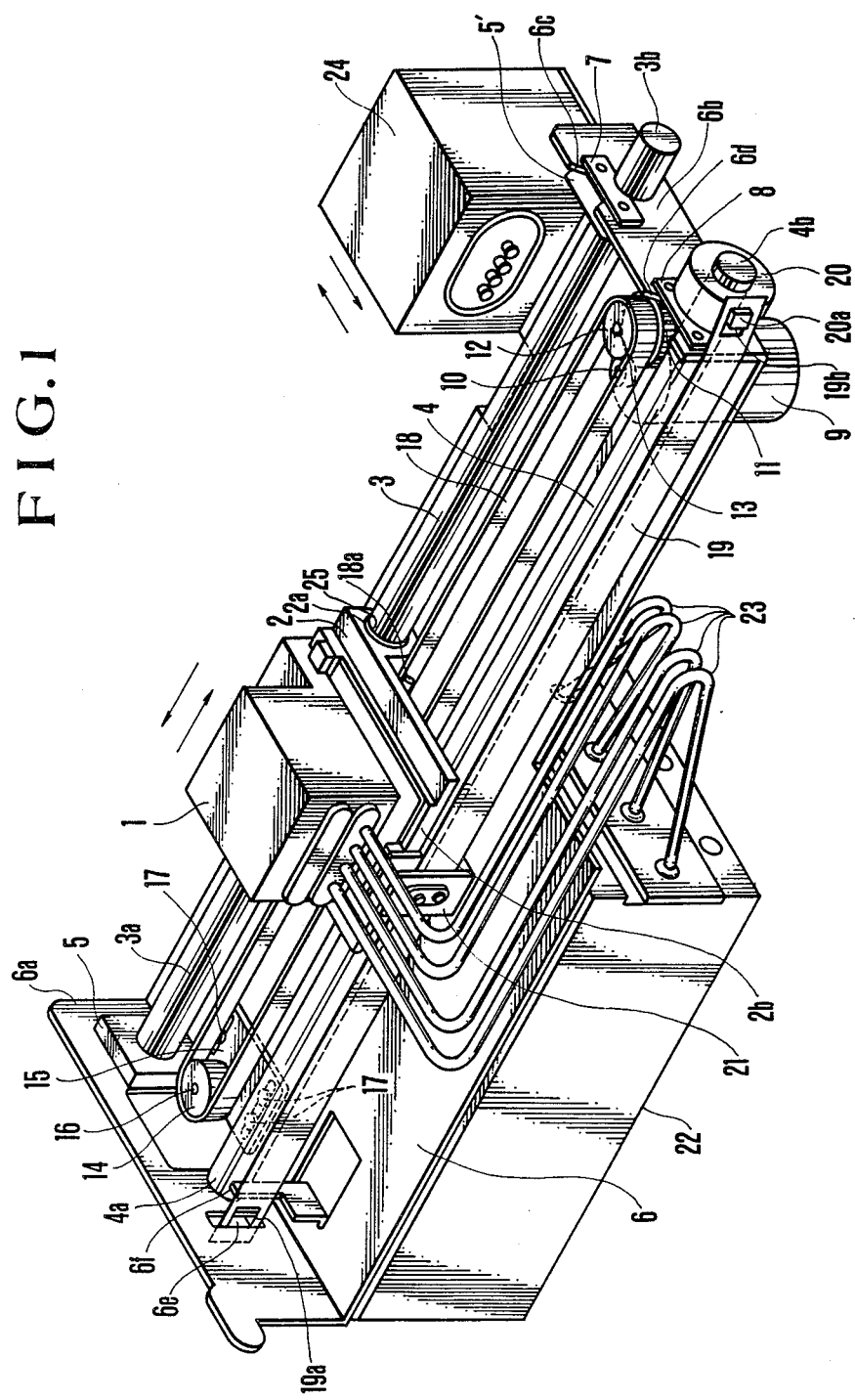
FIG. 1 is a perspective view of a recording apparatus having an embodiment of the scanning mechanism according to the present invention.

FIG. 1 illustrates one embodiment of the present invention applied to the head scanning mechanism in the ink jet printer. An ink jet head unit 1 has, here, four ink jet nozzles and is supported on a carriage 2. A dynamic pressure bearing 25 for a carriage guide shaft 3 is fitted in a penetration hole 2a of the carriage 2.

The term "dynamic pressure" herein used means the pressure that generates when a fluid such as oil or air runs along grooves. By utilizing this dynamic pressure in the bearing 25, the guide shaft 3 and the bearing 25 are supported in non-contacting relation with each other in order to reduce the load that accompanies with the movement of the carriage.

Figure 2:
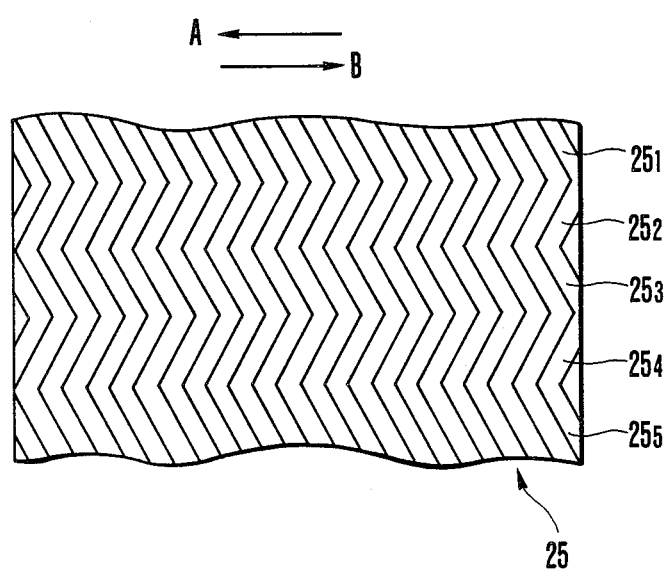
FIG. 2 is an expanded view of a fraction of the inner surface of the bearing of the carriage shown in FIG. 1.

That is, the dynamic pressure bearing 25 is formed by molding wear-resisting synthetic resin, and is rigidly fitted in the hole 2a of the carriage 2. Also, its inner surface has a plurality of circumferential grooves each bent a plurality of times as shown in FIG. 2 (where only five groove strokes $25_1$ to $25_5$ are shown) so that the adjacent two of the groove strokes are oppesedly slanted with respect to each other. These constitute a so-called herringbone-shaped grooving. And, when the carriage 2 moves in a direction of arrow A in FIG. 2, the groove strokes are paired up as $25_1$–$25_2$; $25_3$–$25_4$; and so on to produce a positive pressure on the surface of the guide shaft 3. Conversely when the carriage 2 moves in the direction of arrow B, the groove strokes $25_2$–$25_3$; $25_4$–$25_5$; and so on are paired to produce the positive pressure. For note, the above-described bent grooves are formed at the same time when the bearing 25 is molded. So, the production cost of the bearing 25 is very low. Also, the inner diameter of the bearing 25 has a clearance to the outer diameter of the guide shaft 3 which is suited to obtain a proper positive pressure by the above-described phenomenon.

Considering the right side margin of bearing 25 in FIG. 2, a circumferentially continuous end groove has successive stokes or portions $25_1$ through $25_5$. Such end groove defines plural, circumferentially spaced openings in communication with the right side margin of bearing 25, namely, one formed jointly by end groove portions $25_1$ and $25_2$, another formed by end groove portions $25_3$ and $25_4$, and a further formed by end groove portion $25_5$. As will be appreciated, such plurality of circumferentially spaced end groove openings into the circumferentially continuous end grooves facilitates lubrication of the mechanism and the creation of the descrived dynamic pressure in bearing 25.

Returning to FIG. 1, another guide shaft 4 is arranged in parallel with the guide shaft 3. Their left hand ends 3a and 4a pass through respective holes in a side wall portion 6a as formed by bending the left hand side of a base plate 6 and are fixedly secured to the side wall portion 6a at the outside thereof by nuts or the like. Their right hand ends 3b and 4b are put in respective letter "V"-shaped cutouts 6c and 6d of a right hand side wall portion 6b of the base plate 6, and then fixedly secured thereto by respective retainer plates 7 and 8. The retainer plates 7 and 8 are fixed to the side wall portion 6b by screw fasteners.

Here, when mounting the guide shafts 3 and 4 on the base plate 6, the right hand ends 3b and 4b of the guide shafts 3 and 4 are allowed to rest on the right hand side wall portion 6b of the base plate 6 at the respective cutout portions 6c and 6d. Then, the right hand ends 3a and 4a of the guide shafts 3 and 4 are brought into axial alignment with the mount holes previously formed in the right hand side wall portion 6a, and are slidingly moved to the left so that their ends 3a and 4a first pass through the mount holes and then project out of the holes. On the outside of the left hand side wall portion 6a they are then rigidly fastened by nuts. After that, the other guide shaft ends 3b and 4b are fixedly secured to the right hand side wall 6b by the retainer plates 7 and 8. Such an assembling process has advantages that the possibility of occurrence of damages on the guide shafts 3 and 4 is lessened, the assembling operation becomes very easy, and, because the side wall portions 6a and 6b are in unison with the base plate 6, the accuracy also can be assured.

Two lubricant supply members 5 and 5' are mounted on the guide shaft 3 at respective points near the ends 3a and 3b thereof, and are made of, for example, felt, sponge, or the like, impregnated with lubricant oil. Here, the mounting positions of the supply members 5 and 5' may be in coincidence either with the limits of a prescribed range of movement of the carriage 2 so that the carriage 2 can touch either of the supply members 5 and 5' each time the reciprocating scanning movement of the carriage 2 is recycled, or with a home position (the right end portion as viewed in FIG. 1) it takes when in non-recording, and a waiting position (the left hand end portion as viewed in FIG. 1) it takes temporarily for preparing purposes. In the former case, at the time of each of the start and end of one full scanning line during recording, the carriage 2 abuts selectively on both supply members 5 and 5'. In the latter case, it abuts on them at the time of start of a recording operation and at the time of returning to the home position after the end of the recording operation. And, at the time of its abutting on the supply members 5 and 5', the carriage 2 is supplied with the lubricant oil at its bearing 25. For note, in this embodiment, the latter means is employed.

Also, by constructing the supply members 5 and 5' in the form of soft members of felt, sponge, or the like, they can be made to serve as shock absorbers against the carriage 2, contributing to a prevention of damages and malfunction of the scanning mechanism. Also, in this embodiment, the supply member 5, 5' is provided for either end of the guide shaft 3, but may be provided for only one of the ends thereof. Even in this case, the effect is sufficient.

The carriage 2 is engaged on the carriage guide shaft 3 at its bearing 25. As for the guide shaft 4, its lower surface abuts on it at a line near the side edge thereof.

A carriage drive motor 9 is mounted on the lower surface of the base plate 6 at a point near the right hand side wall portion 6b. A pinion 10 mounted on the output shaft of the motor 9 projects outwardly of the upper surface of the base plate 6, and meshes with a gear 11 rotatably mounted on a shaft 13 on the upper surface of the base plate 6 and unified with a pulley 12. Meanwhile, an idler pulley 14 is rotatably mounted on a shaft 16 planted on a mount plate 15 on the upper surface of the base plate 6 at a point near the left hand side wall portion 6a. The position of the mount plate 15 is adjustable relative to the base plate 6, and is fixedly secured thereto by screw fasteners 17. An endless rubber belt 18 is trained between the pulleys 12 and 14, and is connected at a portion 18a thereof to the carriage 2.

Therefore, when the reversible motor 9 rotates in either direction, the belt 18 is driven to move back and forth, and the carriage 2 fixed thereto is made to move reciprocatingly as shown by arrows in FIG. 1 on the guide shafts 3 and 4 for scanning purposes.

A slit plate 19 as a linear encoder is tensioned between both side wall portions 6a and 6b of the base plate 6 in parallel with the guide shaft 4. That is, the slit plate 19 is hooked at a hole portion 19a provided in the left hand end portion thereof to a pawl portion 6e provided in the left hand side wall portion 6a of the base plate 6 and its position is determined by an extension 6f. Also, it is disposed at another hole portion 19b provided in the right hand end portion thereof to a projected portion 20a of a bobbin 20 position-adjustably mounted on the right hand end portion of the guide shaft 4. For note, a spring is incorporated inside the bobbin 20 to the projected portion 20a to the right as viewed in FIG. 1 so that a proper tension is given to the slit plate 19.

A great number of slits are formed in the slit plate 19 to obtain timings of printing. Each of these slits is detected by a detector 21 including a photocoupler mounted to the side edge 2b of the carriage 2 to form a timing signal.

An ink tank 22 has chambers or containers storing inks to be supplied to the respective four nozzles of the head unit 1. These chambers or containers are connected to the nozzles through respective flexible ink supply tubes 23.

A cap unit 24 is provided in a corresponding position to the home position (the right hand end portion position of the drawing) of the head unit 1, and is moved back and forth in directions indicated by arrows by means (not shown) in order to perform capping of the tip of each nozzle and also release this. For note, it is better that this cap unit 24 is equipped with a suction pump for recovering the function of each nozzle of the head unit as the nozzle has been clogged.

In operating the mechanism described above, when the head unit 1 lies in the home position, the carriage 2 is in contact with the right hand supply member 5' at its right hand side wall thereof. At this time, the supply member 5' feeds the lubricant to the bearing 25. Then to initiate a recording operation, the carriage 2 is moved to the waiting position (the left hand end portion position of the drawing) by the drive mechanism including the motor 9, whereby now its left hand side wall comes to contact with the opposite supply member 5, and here also is fed with the lubricant.

Subsequently, as recording goes on, the carriage 2 reciprocatingly moves on the guide shafts 3 and 4 over a prescribed range of scanning movement by the reciprocating movement of the belt 18 due to the forward-reversed rotation of the motor 9. During this time, ink particles from each nozzle of the head unit 1 is cast in response to a timing signal picked up from the slit plate 19 by the detector 21, and printing is performed on a recording paper (not shown). And, in this case, a positive pressure is exerted in between the inner circumferential surface of the bearing 25 of the carriage 2 and the surface of the guide shaft 3 according to the rule described in connection with FIG. 2. Therefore, the carriage 2 can very smoothly move back and forth, due to a lowered load and a reduced range of variation of the load.

One embodiment of the invention is as such. But, as has been mentioned above, the supply members 5 and 5' may be otherwise positioned in coincidence with the terminal ends of the full scanning movement of the head carriage 2 so that the bearing 25 is fed twice with the lubricant for every one scanning line. Another modification is such that only one supply member, for example, the member 5, may be provided. For note, when the amount of lubricant impregnated in the supply member is depleted 5, 5', the user needs only to replenish it.

Also the invention is not confined to the head scanning mechanism, but is applicable to other types of head scanning mechanisms in magnetic or optical disc or drum recording and reproducing apparatus.

As has been described in great detail above, according to the present invention, the scanning mechanism of the kind described in the opening paragraph can be made constructed in such a form that the load that accompanies with the movement of the carriage is remarkably reduced, and stabilized against variation, and that the speed of scanning movement is greatly increased, while still maintaining noise at a low level, and extension of the life-time to be achieved. Furthermore, the maintenance of lubrication of the carriage bearing portion is made almost free. Also, simple means suffice for assurance of sufficiently high accuracy. Nevertheless, the assemblying operation is very easy, and release from the fear of damaging the guide shaft is attained. Thus, the scanning mechanism of the invention has great advantages on utility in actual practice.

What is claimed is:

1. A scanning mechanism for a recording apparatus comprising:
   (a) a recording head;
   (b) a carriage on which said recording head is installed, said carriage having a penetration hole;
   (c) a guide shaft passing through said penetration hole so that said carriage is caused to move in a scanning direction;
   (d) a bearing for said guide shaft fitted in said penetration hole, said bearing having means for exerting dynamic pressure when said carriage moves, and the load that accompanies with the movement of said carriage being reduced by this dynamic pressure; and
   (e) a lubricant supply member provided on said guide shaft in a position at which said carriage arrives, such carriage arrival position being a home position in which the carriage lies when in non-recording mode.

2. A mechanism according to claim 1, wherein said lubricant supply member serves as a shock absorber.

3. A scanning mechanism for a recording apparatus comprising:
   (a) a recording head;
   (b) a carriage on which said recording head is installed, said carriage having a penetration hole;
   (c) a guide shaft passing through said penetration hole so that said carriage is caused to move in a scanning direction;
   (d) a bearing for said guide shaft fitted in said penetration hole, said bearing having means for exerting dynamic pressure when said carriage moves, and the load that accompanies with the movement of said carriage being reduced by this dynamic pressure; and
   (e) a support member supporting both ends of said guide shaft, said support member being bent at its opposite end portions to form two support portions, one of which is made a cutout portion.

* * * * *